Oct. 16, 1956  R. TISHLER  2,766,530
SURVEYING INSTRUMENT
Filed March 31, 1953  3 Sheets-Sheet 1
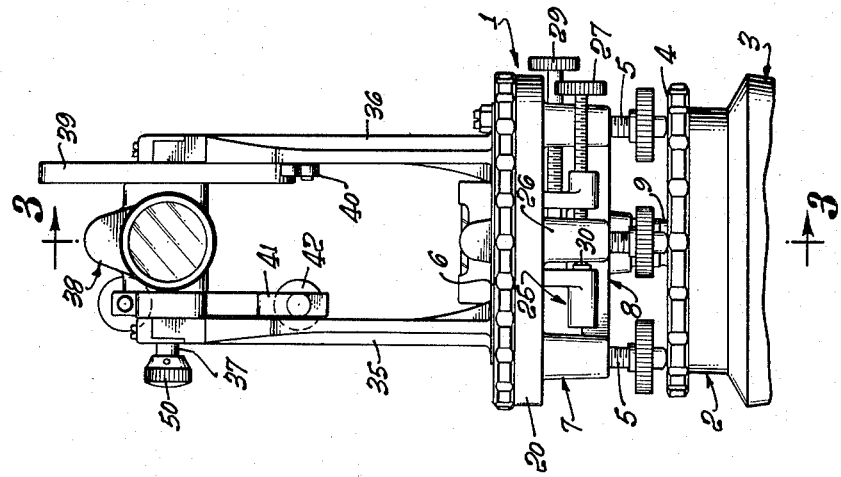
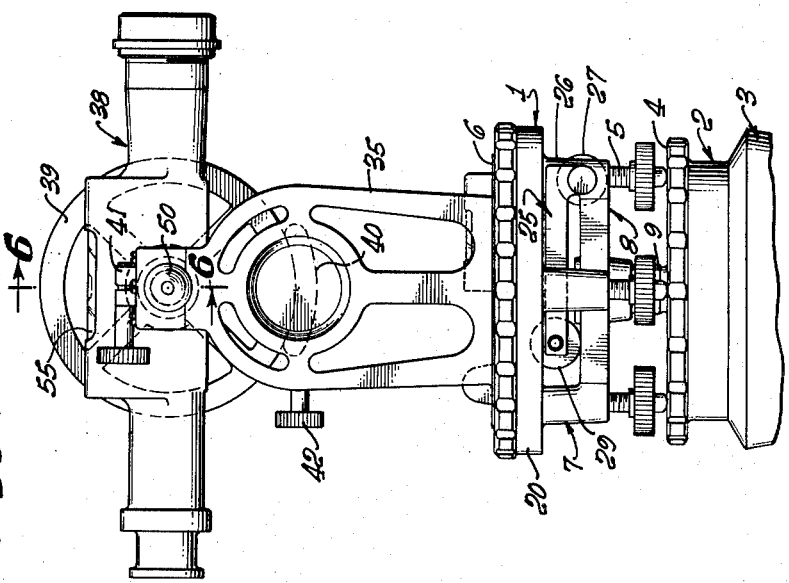
INVENTOR:
RICHARD TISHLER,
BY
ATTORNEY.

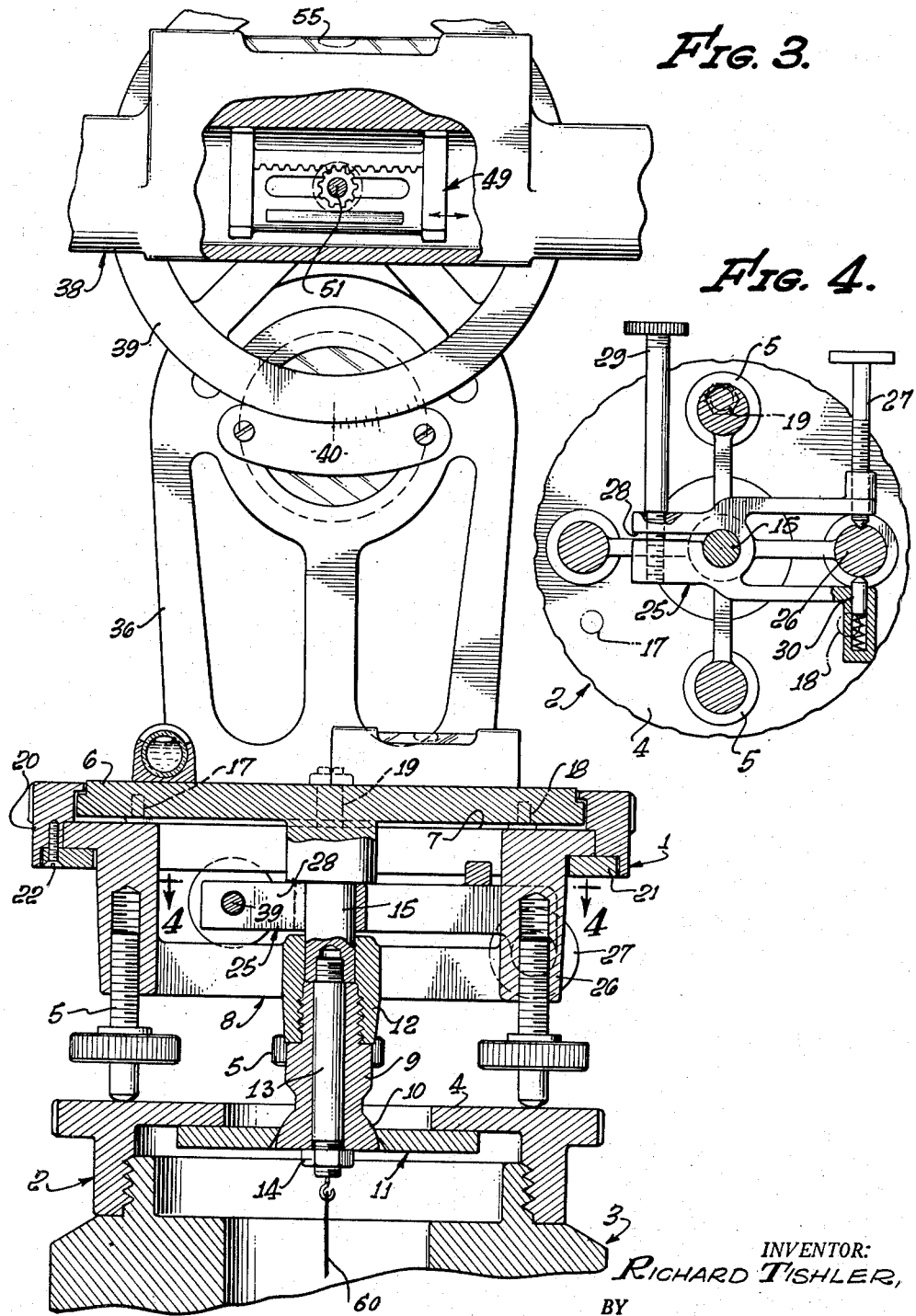

Oct. 16, 1956 R. TISHLER 2,766,530
SURVEYING INSTRUMENT
Filed March 31, 1953 3 Sheets-Sheet 3

INVENTOR:
RICHARD TISHLER.
BY O. J. Martin
ATTORNEY.

United States Patent Office 2,766,530
Patented Oct. 16, 1956

2,766,530
SURVEYING INSTRUMENT
Richard Tishler, Pasadena, Calif.
Application March 31, 1953, Serial No. 345,882
4 Claims. (Cl. 33—46)

This invention relates to surveying instruments and has for its object to provide improved means for setting the instrument in vertical alinement with the mark on the ground from which the surveying is to be done. A further object is to provide improved, simplified means for maintaining the telescope axis and optical axis in correct parallel relation to each other in any position of horizontal rotative adjustment of the instrument. A still further object is to provide improved means for adjusting the position of the focusing lens within the telescope.

These and other objects of the invention as well as the many advantageous features thereof will be appreciated upon perusal of the following detailed description and by referring to the accompanying drawing in which a preferred form of the invention is illustrated.

In the drawings:

Figs. 1 and 2 are side elevational views of the invention taken at right angles to each other;

Fig. 3 shows, on a larger scale, the essential features of the device and with parts thereof broken away for the sake of clearness;

Fig. 4 is a sectional plan view taken substantially on line 4—4 of Fig. 3; and

Figure 5:
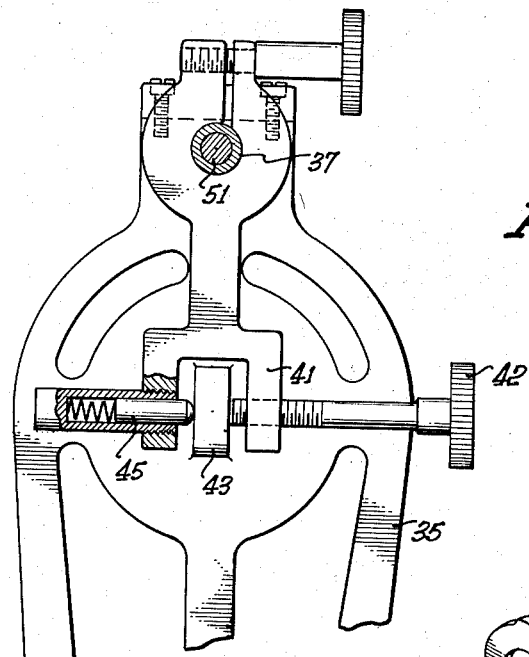
Figs. 5 to 7 are fragmentary views illustrating important features of the invention.
Figure 7:
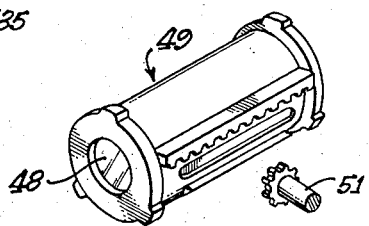
Figure 6:
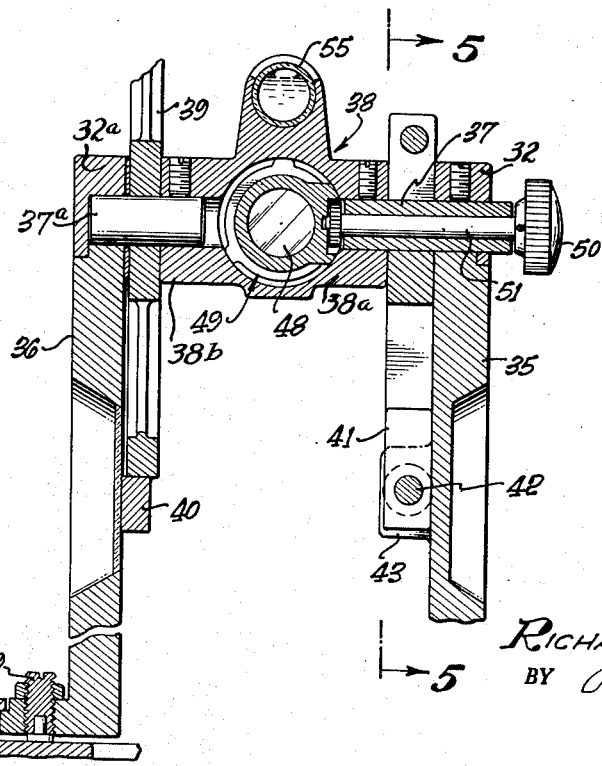

The device of the invention comprises a base 1 which is mounted for rotation on a tripod plate 2 and this plate is rigidly secured in position on the head 3 of a conventional tripod. The tripod plate of surveying instruments usually contains the socket of a ball and socket joint and it has a smooth upper surface 4 upon which a series of leveling screws 5 come to rest. This ball and socket joint is omitted and the construction is simplified in the following manner.

The base 1 of the instrument includes a circular plate 6 which rides on the upper surface of an annular support 7. A quadrifid bracket 8 projects downwardly from this support and threaded recesses are sunk into the lower ends of the legs of this bracket of a size to receive therein the leveling screws 5. A boss 15 projects axially from the bottom surface of the plate 6 and a stud 9 is by a nut 12 held in continued axial alinement with this boss. The lower end of the stud 9 is shown outwardly flared to provide a spherical shelf 10 which, in turn, rides in a bearing plate 11. A stem 13 extends from the boss 15 through the stud 9 and a nut 14 engages the lower end of this stem axially to combine the base of the instrument with the tripod plate 2 for horizontal adjustment of the base on the plate in any direction. In practice, the instrument is first turned into the required direction whereupon the support is adjusted radially on the tripod plate into correct position. The nut 14 is then tightened to maintain the support in this position during the subsequent angular adjustment of the support.

The circular plate 6 is held seated on the upper surface 7 of the support 1 by means of three radially and circumferentially equidistantly spaced studs 17, 18, 19 and one of these studs is, as indicated at 19 in Fig. 1, mounted for axial adjustment in the plate on a line diametrically through the axis of the plate parallel with the telescope spindle. An annular guide 20 is placed about the plate and the outer rim of the support 7 correctly to position the plate thereon and an annular washer 21 is by screws 22 clamped in position on the under surface of the guide to maintain these parts assembled in correct relation to each other.

When the above described lower portion of the device is in this manner assembled, it is found that the plate 6 and the telescope mounted thereon may be rotated horizontally on the tripod plate into any required angular position thereon. A bifurcated lever 25 is mounted for rotation on the stem 15 and the tines of this lever straddle the arm 26 of the bracket 8, see Fig. 4. A screw 27 is seated in one of the tines of the lever for manual rotation to direct the end of the screw against the side surface of the arm. The other end of the lever is slotted, as indicated at 28 in Fig. 4, and a screw 29 is seated in this slotted end to clamp the lever rigidly in position on stem 15 thereby to limit the extent of rotation of the telescope on the tripod plates to the clearance between the tines of the lever and the arm of the bracket. A spring-held plunger 30 is seated in the other tine of the lever in axial alinement with the adjusting screw 27. From this description, it is seen that the telescope may be turned horizontally on the tripod into approximate angular position thereon, whereupon the screw 29 is operated to clamp the lever in position on the boss 15. The screw 27 may then be advanced against the side surface of the arm 26 to swing the bracket 8 relative to the lever thereby to obtain fine circumferential adjustment of the telescope on the tripod.

From the circular plate 6 rise standards 35, 36, the upper ends of which are recessed to form seats for two short axially alined stems 37, 37a which are clamped in position within bosses 38a, 38b of the telescope 38 to form therewith the telescope spindle. But the stems may, if preferred, form integral parts of the telescope bosses. Caps 32, 32a, mounted on the upper ends of the standards, may be added to lock the spindle in position when the instrument is dismantled and transported to new locations. A skeletonized disk 39 is rigidly secured to the spindle and the side surface of the telescope to form the conventional vertical circle of the instrument. The rim of this disk is as usual in practice graduated, together with the graduations of a sector 40 to form the vernier of the vertical circle by means of which any desired vertical angles of the telescope may be measured. Approximate adjustment may be obtained by manual rotation of the telescope on its spindle, whereupon the final adjustment is accomplished in the same manner that the fine horizontal adjustment of the instrument on the head of the tripod is obtained and as generally outlined at 41—45 in Fig. 5, the tangent screw 42 being manually operable to effect this fine adjustment.

As in all fine surveying instruments, the telescope tube is closed at one end by the objective lens and at the other end by the eye-piece lens. The focusing lens 48 is mounted in a draw-tube 49 which is axially adjustable within the telescope. The mechanism for moving the tube includes a knob 50 at the outer end of a stem 51 which extends axially through the telescope spindle 37. A pinion is secured on the inner end of this stem in position to engage the teeth of the rack to move the stem in response to rotation of the knob 50. The advantage of this arrangement should be clear to anyone familiar with the operation of surveying instruments. In most of the instruments that have come to my notice, the knob of the pinion screw for the focusing lens adjustment is placed on top of the telescope. This is an awkward arrangement compelling the operator to raise and to curve his arm above his head in order to turn the knob. And because of this cramped arm position, it is often found that the vertical angle of the telescope is disturbed while adjusting the lens, necessitating resetting to the correct angle. But with the adjusting screw on the spindle axis the arm may be held in a natural position and the screw may be turned without danger of tipping the telescope.

It is most important in operating fine surveying instruments for the axis of the telescope to be coaxial with the optical axis through the lenses and a spirit level is ordinarily mounted on the telescope of such instruments for adjustment relative thereto to determine when the telescope and the optical axis are horizontally coaxial. This is a very complex and expensive arrangement which I have succeeded in simplifying in the following manner. The spirit level 55 is rigidly secured in position on top of the telescope tube in parallel relation to the longitudinal axis of the tube. But because no assurance is present that the optical axis through the lenses will be or remain coaxial with the tube axis, it becomes necessary to provide means for correcting any error in the setting of the instrument. Since the telescope is mounted for vertical rotation on its horizontal spindle, it is found that no other means of vertical adjustment is required but it does become necessary, when the instrument is rotated horizontally on the support 1, to provide such means, and this is the reason for fitting the circular plate 6 with the three studs 17, 18 and 19. These studs, or at least the heads thereof, are made from material of sufficient hardness to resist wear and yet soft enough not to scratch or otherwise to mar the surface of the support on which they are positioned to slide during horizontal rotation of the instrument. As above stated, one of these studs is mounted for axial adjustment and it is important to note that this stud, which is indicated at 19 in Figs. 3 and 4, is placed near the periphery of the circular plate 6 and at right angles to the horizontal axis of the telescope. When so positioned, it is found that any variation of the horizontal axis of the telescope tube and the optical axis which may develop as the instrument is rotated horizontally on its support may be corrected by adjustment of this stud. When, in addition, the diameter of the circle on which the three studs are placed is relatively large, it is found that very fine correction of such errors may be readily effected. A great advantage of this arrangement is that the expensive ball and socket joint, above referred to, may be replaced by the simple method of seating the lower end 10 of the support stud 9 in the bearing 11. It is also important to note that the bearing plate 11 is so much smaller in diameter than the inner diameter of the tripod plate 2 that the instrument may be shifted considerable distances on this plate to aline the plumb line 60 with the mark on the ground above which the instrument is placed. The conventional ball and socket joint permits of no such shifting and the placing of the tripod thereof is a slow and painstaking operation.

It is seen from the foregoing description that I have provided in a fine surveying instrument of the generally approved type simple and conveniently operable devices positioning the device and for effecting the various settings and adjustments of the instrument. But while I have above described a preferred form of the invention, this is not to be considered a limitation but right is reserved to embody therein modifications within the scope of the claims hereto appended.

I claim:

1. A surveying instrument mountable on a tripod having at the top thereof an annular tripod plate, said instrument comprising, an annular support resting on said tripod plate, a circular telescope base plate seated for rotation on the upper surface of said support, the plate having three equidistantly spaced perforations therethrough on a line concentric with the axis of the base, three studs seated in said perforations and downwardly projecting from the base plate to maintain the plate slightly elevated above the upper surface of the support, one of the studs being positioned for axial adjustment in the plate on a diameter parallel with the telescope spindle, the support being radially adjustable on the tripod plate in any direction, means for locking the support in position on the tripod plate, standards rising from the telescope base plate, and a telescope having intermediate its ends axially alined bosses transversely projecting therefrom to form the spindle of the telescope, the standards having at the upper ends thereof seats for the telescope spindle.

2. A surveying instrument mountable on a tripod having at the top thereof an annular tripod plate, said instrument comprising, an annular support resting on said tripod plate, a circular telescope base plate seated for rotation on the upper surface of said support, means for limiting rotation of the base plate on the support, the plate having three equidistantly spaced perforations therethrough on a line concentric with the axis of the base, three studs seated in said perforations and downwardly projecting from the base plate to maintain the plate slightly elevated above the upper surface of the support, one of the studs being seated for axial adjustment in the plate on a diameter parallel with the telescope spindle, the support being radially adjustable on the tripod plate in any direction, means for locking the support in position on the tripod plate, standards rising from the telescope base plate, and a telescope having intermediate its ends axially alined bosses transversely projecting therefrom, stems seated in said bosses to form the spindle of the telescope, the standards having at the upper ends thereof seats for the telescope spindle, and caps mountable on the standards to lock the spindle in position therein.

3. A surveying instrument mountable on a tripod having at the top thereof an annular tripod plate, said instrument comprising, an annular support resting on said tripod plate, a circular telescope base plate seated for rotation on the upper surface of said support, the plate having three equidistantly spaced perforations therethrough on a line concentric with the axis of the base, means for limiting rotation of the base plate on the upper surface of the support, three studs seated in said perforations and downwardly projecting from the telescope base plate to maintain the plate slightly elevated above the upper surface of the support, one of the studs being seated for axial adjustment in the plate on a diameter parallel with the telescope spindle, the support being radially adjustable on the tripod plate in any direction, means for locking the support in position on the tripod plate, standards rising from the telescope base plate, a telescope having intermediate its ends axially alined bosses transversely projecting therefrom, stems seated in said bosses to form the spindle of the telescope, the standards having at the upper ends thereof seats for the telescope spindle, and a spirit level rigidly mounted on the telescope tube in parallel relation to the longitudinal axis thereof.

4. A surveying instrument mountable on a tripod having at the top thereof an annular tripod plate, said instrument comprising, an annular support resting on said tripod plate, a circular telescope base plate seated for rotation on the upper surface of said support, the plate having three equidistantly spaced perforations therethrough on a line concentric with the axis of the base, means for limiting rotation of the base plate on the upper surface of the support, three studs seated in said perforations and downwardly projecting from the telescope base plate to maintain the plate slightly elevated above the upper surface of the support, one of the studs being seated for axial adjustment in the plate on a diameter parallel with the telescope spindle, the support being radially adjustable on the tripod plate in any direction, means for locking the support in position on the tripod plate, standards rising from the telescope base plate, a telescope having intermediate its ends axially alined bosses transversely projecting therefrom, stems seated in said bosses to form the spindle of the telescope, the standards having at the upper ends thereof seats for the telescope spindle, caps mountable on the standards to lock the spindle in position therein, and a spirit level rigidly mounted on the telescope tube in parallel relation to the longitudinal axis thereof.

References Cited in the file of this patent

UNITED STATES PATENTS

| | | |
|---|---|---|
| 20,915 | Young | July 13, 1858 |
| 453,159 | Paoli | May 26, 1891 |
| 1,010,339 | Angel | Nov. 28, 1911 |
| 1,234,520 | Wissler | July 24, 1917 |
| 1,781,667 | Mihalyi | Nov. 11, 1930 |
| 1,998,775 | Bunstine | Apr. 23, 1935 |

FOREIGN PATENTS

| | | |
|---|---|---|
| 18,055 | Switzerland | Dec. 9, 1898 |
| 9,690 | Great Britain | of 1913 |
| 348,709 | Germany | Feb. 14, 1922 |
| 93,573 | Sweden | July 28, 1938 |